Patented July 16, 1940

2,208,170

UNITED STATES PATENT OFFICE 2,208,170

AZO DYESTUFFS AND PROCESS OF MAKING SAME

Fritz Straub and Peter Pieth, Basel, Switzerland, assignors to the firm Society of Chemical Industry in Basle, Basel, Switzerland No Drawing. Application May 18, 1938, Serial No. 208,702. In Switzerland May 22, 1937

13 Claims. (Cl. 260—149)

This invention consists in a manufacture of azo-dyestuffs in which at least one of the components taking part in the coupling is a substituted perinaphthindandione. In some cases the azo-dyestuffs thus obtainable, if at least one component having lake-forming groups has been used for producing the same, may be treated with agents yielding metal.

Substituted perinaphthindandiones which may be used for the manufacture of azo-dyestuffs in accordance with the invention may be substituted in one or several desired places, preferably in the naphthalene nucleus. As substituents there come into consideration all substituents generally used in the chemistry of the aromatic compounds, for example alkyl groups having short or long carbon chains, amino, hydroxyl and carboxyl groups as well as the functional derivatives thereof, further halogens, nitro-groups and the like. It is of advantage to use perinaphthindandiones substituted in 6- (or 7-) position, or particularly perinaphthindandiones substituted in 5- or 8-) position, for example 5-nitro-, 5-amino- and 5-hydroxy-perinaphthindandiones and perinaphthindandione-5-sulfonic acids.

For the system of orientation of substituents in perinaphthindandione see Beilstein's Handbuch, 4th edition, supplement volume VII, page 391. In so far as these products have not hitherto been described they may be made by the process described in our U. S. Patent 2,163,110, of June 20, 1939.

These substituted perinaphthindandiones may be used on the one hand as coupling components. Those substituted perinaphthindandiones which contain no hydroxy-group or amino-group in the naphthalene nucleus couple with one molecular proportion of a diazo compound, whilst those substituted perinaphthindandiones containing a hydroxy-group or amino-group in the naphthalene nucleus are capable of combining with two molecular proportions of a diazo compound. There are suitable as diazo compounds various components of the benzene and naphthalene series, such as for example aniline, naphthylamines as well as the corresponding sulfonic acids or further substitution products. Advantageously there is used a diazo compound containing a lake-forming group, for example an ortho-alkoxy- or ortho-carboxydiazo-benzene, an ortho-hydroxydiazobenzene, an ortho-hydroxydiazonaphthalene or a diazobenzene containing the salicyclic acid grouping. These diazo compounds may be substituted in any desired manner, for example by alkyl, nitro, sulfonic acid or carboxyl groups or halogen. Valuable dyestuffs are obtained for example from such 1-hydroxy- or 1-carboxy-2-diazobenzenes which are substituted in 4- or 6-position by a sulfonic acid group, and in 6- and 4-position, respectively, if desired, by a further negative substituent, for example by a further sulfonic acid group, a nitro group or halogen.

On the other hand the amino-perinaphthindandiones can also be used as diazo components and may be combined with various coupling components, for example with hydroxybenzenes, hydroxynaphthalenes or compounds having a carbon atom capable of coupling and belonging to a heterocyclic ring system as is the case for example in the pyrazolones.

The coupling may be conducted according to known methods in a neutral, alkaline or acid medium. Mono-, dis- and poly-azodyestuffs can be made in accordance with the invention.

The dyestuffs obtainable in accordance with the invention may be used for dyeing various materials. Those of the dyestuffs which contain sulfonic acid groups may be used with advantage for dyeing animal fibers, for example wool, silk and leather.

Particularly valuable dyeings are obtained if the dyestuff is treated in substance, in the dye bath or on the fiber with an agent yielding a metal, for example chromium, copper, nickel, cobalt or manganese, which metal may produce a complex compound with the dyestuff.

The treatment of the dyestuff in substance with an agent yielding metal, for example chromium, copper, nickel or cobalt, may be conducted in known manner in an acid, neutral or alkaline medium, with or without suitable additional substances, for example a salt of an inorganic or organic acid, a free acid, for example tartaric acid or another hydroxycarboxylic acid, and in presence or absence of an organic solvent or diluent, for example alcohol, glycerine or pyridine. The treatment may be conducted in an open vessel or under pressure.

The treatment of the dyestuff on the fibre or in the dye bath with an agent yielding metal, preferably chromium, may be conducted in the generally known manner, for example with an alkali bichromate or an alkali chromate. The dyestuffs containing metal bound in complex form may be used for dyeing various materials, such as textiles, leather, varnishes, masses of various kinds, for example spinning masses, resins, artificial resins or gelatine; they may also be used as pigment dyestuffs. They yield shades which are very fast, especially to light.

The following examples illustrate the invention, the parts being by weight unless otherwise stated and the parts by weight and parts by volume being related in the same manner as are the kilo and the litre.

Example 1

23.4 parts of 4-nitro-2-amino-1-hydroxybenzene-6-sulfonic acid are diazotized in the usual manner in a hydrochloric acid solution with 6.9 parts of sodium nitrite and the diazo solution is neutralized with sodium carbonate solution. The diazo compound thus prepared is coupled at 0–8° C. with a solution prepared from 24.6 parts of 5-nitro-perinaphthindandione, 10.6 parts of anhydrous sodium carbonate and 100 parts of water. When coupling is finished the reaction mixture is neutralized with hydrochloric acid and the dyestuff of the formula

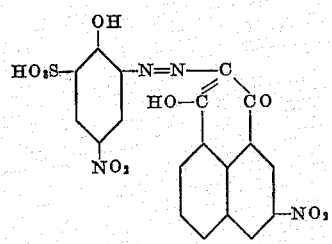

is isolated by salting out, filtered and dried.

It is a black powder soluble in water to a red solution, in sodium carbonate solution of 10 per cent strength, and in caustic soda solution of 10 per cent strength in red-orange solutions and in concentrated sulfuric acid to a yellow solution. The dyestuff dyes wool violet-brown shades which become red-brown when afterchromed.

Example 2

4.8 parts of the azo-dyestuff obtained according to Example 1 from diazotized 4-nitro-2-amino-1-hydroxybenzene-6-sulfonic acid and 5-nitroperinaphthindandione are dissolved in 100 parts of water and 2.1 parts of crystallized sodium acetate are added. The solution is then heated to boiling for 24 hours in a reflux apparatus together with a solution of chromium fluoride corresponding with 0.91 part of $Cr_2O_3$. The reaction mixture is filtered to remove any insoluble matter present, the filtrate is evaporated to a small volume under reduced pressure and the dyestuff is precipitated by the addition of common salt, filtered and dried.

It is a grey powder soluble in water to a red solution, in sodium carbonate solution of 10 per cent strength to a red-orange solution, in caustic soda solution of 10 per cent strength to a brown-orange solution and in concentrated sulfuric acid to an orange solution. The new chromium compound dyes wool and leather brown-red shades.

Example 3

5.2 parts of the azo-dyestuff from diazotized 2-amino-1-hydroxybenzene-4:6 - disulfonic acid and 5-nitroperinaphthindandione of the formula

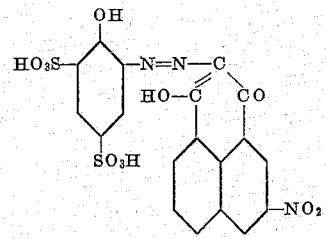

are dissolved in 150 parts of water and the solution is heated to boiling for 10 minutes with a solution of 3 parts of crystallized copper sulfate in 30 parts of water. The new copper compound is precipitated by the addition of common salt, filtered and dried.

It is a grey powder soluble in water and in sodium carbonate solution of 10 per cent strength to red-orange solutions, in caustic soda solution of 10 per cent strength to a brown-orange solution and in concentrated sulfuric acid to a yellow solution. The cupriferous dyestuff dyes leather fast brown-red shades.

Example 4

18.9 parts of 2-amino-1-hydroxybenzene-4-sulfonic acid are dissolved in 100 parts of water together with the required quantity of sodium carbonate. 25 parts by volume of concentrated hydrochloric acid are added and the solution is diazotized at 5–10° C. with an aqueous solution of 6.9 parts of sodium nitrite. The diazo compound is neutralized with sodium carbonate solution and coupled at 0–5° C. with a solution prepared by dissolving 21.5 parts of 5-hydroxy-perinaphthindandione and 21 parts of anhydrous sodium carbonate in 100 parts of water. The dyestuffs of the formula

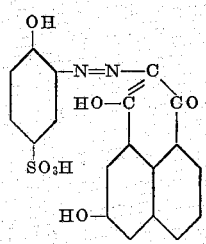

or

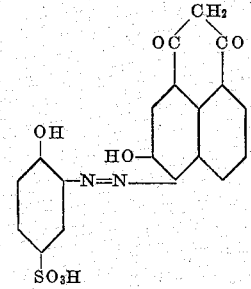

is precipitated by the addition of common salt, filtered and dried.

It is a black powder soluble in water, in sodium carbonate solution of 10 per cent strength and in caustic soda solution of 10 per cent strength to orange solutions and in concentrated sulfuric acid to an orange-red solution. The dyestuff dyes wool olive-brown shades which become violet-brown when after-chromed.

Example 5

4.1 parts of the azo-dyestuff obtained according to Example 4 from diazotized 2-amino-1-hydroxybenzene-4-sulfonic acid and 5 - hydroxy-perinaphthindandione are dissolved in 80 parts of water and the solution is heated to boiling for 24 hours together with a solution of chromium formate corresponding with 0.9 part of $Cr_2O_3$. The solution is filtered whilst hot to remove insoluble matter present and the chromium compound is precipitated from the filtrate by the addition of common salt, filtered and dried.

It is a black powder soluble in water and in sodium carbonate solution of 10 per cent strength to brown-red solutions, in caustic soda solution of 10 per cent strength to a brown-orange solution and in concentrated sulfuric acid to an olive-yellow solution. The new chromium compound dyes leather violet-brown shades of very good fastness properties.

*Example 6*

46.8 parts of 4-nitro-2-amino-1-hydroxybenzene-6-sulfonic acid are diazotized in the usual manner and the diazo solution is neutralized at about 0° C. by addition of a saturated solution of sodium carbonate. The diazo compound is coupled at 0–5° C. with a solution prepared by dissolving 21.5 parts of 5-hydroxyperinaphthindandione and 21 parts of anhydrous sodium carbonate in 100 parts of water. The new dyestuff of the formula

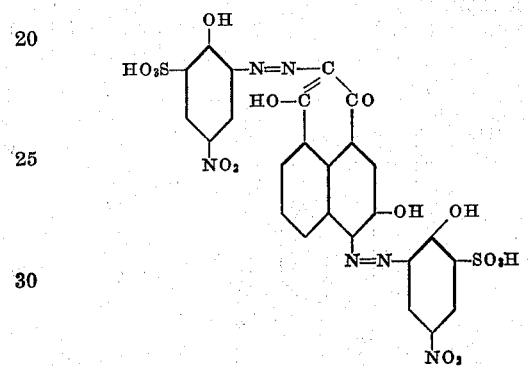

is precipitated by the addition of common salt, filtered and dried.

It is a grey-black powder soluble in water to a blackish-violet solution, in sodium carbonate solution of 10 per strength and in caustic soda solution of 10 per cent strength to brown and red dichroic solutions and in concentrated sulfuric acid to a red solution. It dyes wool violet-black shades which become blackish-brown-violet when after-chromed.

*Example 7*

7 parts of the dis-azo-dyestuff obtained according to Example 6 from 2 mols of 4-nitro-2-amino-1-hydroxybenzene-6-sulfonic acid and 1 mol of 5-hydroxy-perinaphthindandione are dissolved in 100 parts of water and the solution is heated to boiling with a chromium formate solution corresponding with 1.8 parts of $Cr_2O_3$ until the azo-dyestuff has become transformed completely into its chromium compound. This compound is precipitated by the addition of common salt, filtered and dried.

It is a grey-black powder soluble in water to a blackish-brown-red solution and in sodium carbonate solution of 10 per cent strength, caustic soda solution of 10 per cent strength and concentrated sulfuric acid to blackish-brown solutions. The new chromium compound dyes leather grey-violet-black shades.

*Example 8*

7 parts of the dis-azo-dyestuff obtained according to Example 6 from 2 mols of diazotized 4-nitro-2-amino-1-hydroxy-benzene-6-sulfonic acid and 1 mol of 5-hydroxy-perinaphthindandione are dissolved in 150 parts of water and the solution is heated to boiling for 10 minutes with a solution of 2.8 parts of crystallized cobalt sulfate in 20 parts of water. There is then added a solution of 3 parts of copper sulfate and 15 parts of water and heating is continued for 10 minutes longer. 5.4 parts of crystallized sodium acetate are then added, the whole is boiled for 3–5 minutes and the new dyestuff containing cobalt and copper is isolated by addition of common salt, filtered and dried.

It is a grey-black powder soluble in water, in sodium carbonate solution of 10 per cent strength and in concentrated sulfuric acid to blackish-brown solutions and in caustic soda solution of 10 per cent strength to a blackish-yellow-brown solution. The new dyestuff dyes wool violet-brown shades of good fastness properties.

*Example 9*

23.4 parts of 2-amino-4-chloro-1-hydroxybenzene-6-sulfonic acid are diazotized in the usual manner and coupled at 0–5° C. with a solution prepared from 21.5 parts of 5-hydroxy-perinaphthindandione, 21 parts of anhydrous sodium carbonate and 100 parts of water. After about 1 hour the diazo compound has disappeared. There is then added a diazo compound prepared in known manner from 25.3 parts of 1-aminobenzene-2:5-disulfonic acid. Coupling is commenced at 0–5° C. and after ½ hour the temperature is gradually raised to 5–8° C. When coupling is finished the dis-azo-dyestuff of the formula

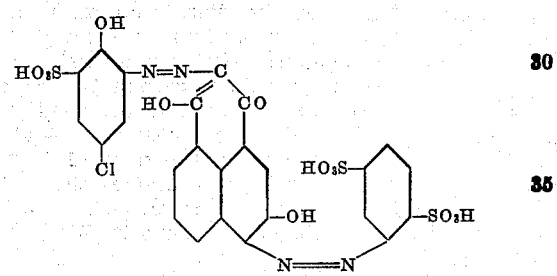

or

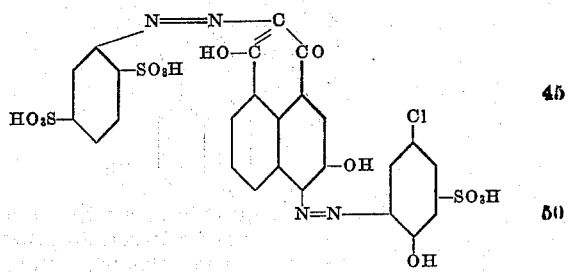

is precipitated by the addition of common salt, filtered and dried.

It is a grey-black powder soluble in water to a blackish-brown solution, in sodium carbonate solution of 10 per cent strength and in caustic soda solution of 10 per cent strength to blackish-brown-red solutions and in concentrated sulfuric acid to a blackish-Bordeaux red solution. It dyes wool in an acid bath brown shades which become blackish-brown-violet when after-chromed.

*Example 10*

21.1 parts of 5-amino-perinaphthindandione and 5.3 parts of anhydrous sodium carbonate are dissolved in 100 parts of water and 25 parts by volume of concentrated hydrochloric acid are added. The amine is diazotized at 5–10° C. with 25 parts by volume of an aqueous solution of 6.9 parts of sodium nitrite and the diazo compound is coupled at 0–5° C. with a solution prepared from 23 parts of 1-hydroxynaphthalene-4-sulfonic acid, 21 parts of anhydrous sodium carbonate and 100 parts of water. When coupling is finished the dyestuff of the formula

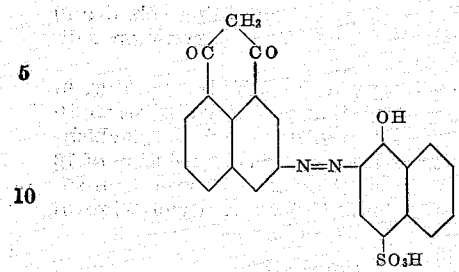

is precipitated by the addition of common salt, filtered and dried.

It is a grey-violet-black powder soluble in water, in sodium carbonate solution of 10 per cent strength and in caustic soda solution of 10 per cent strength to orange-red solutions and in concentrated sulfuric acid to a red solution. The new dyestuff dyes wool red shades which become violet-brown when after-chromed.

*Example 11*

23.4 parts of 4-nitro-2-amino-1-hydroxybenzene-6-sulfonic acid are diazotized in the usual manner with an aqueous solution of 6.9 parts of sodium nitrite and the diazo solution is neutralized by addition of sodium carbonate. 21.5 parts of 5-amino-perinaphthindandione and 16 parts of anhydrous sodium carbonate are dissolved in 100 parts of water and the solution is coupled with the diazo compound at 0–5° C. When coupling is finished the dyestuff is precipitated by the addition of common salt, re-dissolved in 400 parts of hot water, again precipitated by the addition of common salt, filtered and dried.

The dyestuff of the formula

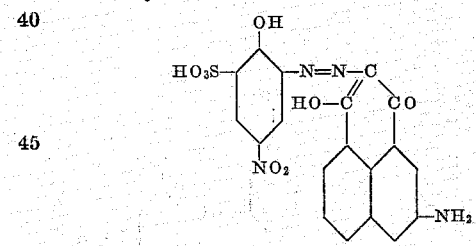

is a black powder having a bronze appearance. It is soluble in water to a red solution, in caustic soda solution of 10 per cent strength and in sodium carbonate solution of 10 per cent strength to orange solutions and in concentrated sulfuric acid to a yellow solution. It dyes wool in an acid bath red shades which become brown-red when after-chromed.

*Example 12*

45.6 parts of the azo-dyestuff prepared according to Example 11 by alkaline coupling from diazotized 4-nitro-2-amino-1-hydroxybenzene-6-sulfonic acid and 5-amino-perinaphthindandione are dissolved in 1000 parts of water and the solution is heated to boiling in a reflux apparatus with a chromium fluoride solution corresponding with 9.1 parts of Cr₂O₃ until the azo-dyestuff has become converted completely into its chromium compound. The chromium compound separates on cooling and is filtered and dried.

It is a grey-black powder soluble in water to a red solution, in sodium carbonate solution of 10 per cent strength to an orange-red solution, in caustic soda solution of 10 per cent strength to an orange solution and in concentrated sulfuric acid to a yellow-orange solution. The new chromium compound dyes animal fibers brown-red shades of good fastness properties.

*Example 13*

22.3 parts of 4-chloro-2-amino-1-hydroxybenzene-6-sulfonic acid are diazotized in the usual manner and the solution, neutralized with sodium carbonate solution, is coupled at 0–5° C. with a solution prepared from 21.5 parts of 5-amino-perinaphthindandione, 16 parts of anhydrous sodium carbonate and 100 parts of water. The mono-azo-dyestuff is precipitated by the addition of common salt and filtered. It is dissolved in 1000 parts of water, 40 parts of crystallized sodium acetate are added and the solution is coupled at 15–20° C. with a diazo solution, acid with hydrochloric acid, prepared in the usual manner from 25.3 parts of 1-amino-benzene-2:4-disulfonic acid. The coupling requires about 36 hours. The dis-azo-dyestuff of the formula

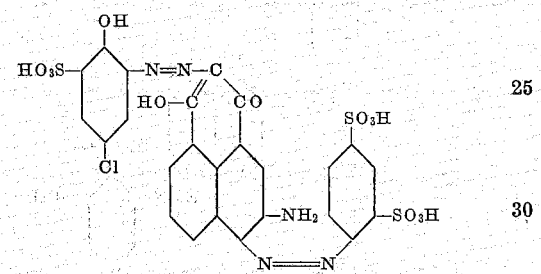

is isolated by precipitation with common salt, filtered and dried.

It is a grey-black powder soluble in water to a yellow-brown solution, in sodium carbonate solution of 10 per cent strength to a blackish-brown-red solution, in caustic soda solution of 10 per cent strength to a blackish-red-orange solution and in concentrated sulfuric acid to a red solution. It dyes wool olive-brown shades which become blackish-violet when after-chromed.

*Example 14*

26.9 parts of 2-amino-1-hydroxybenzene-4:6-disulfonic acid are diazotized in the usual manner, the diazo solution is neutralized and then coupled at 0–5° C. with a solution prepared from 21.5 parts of 5-amino-perinaphthindandione, 16 parts of anhydrous sodium carbonate and 100 parts of water. The reaction mixture is neutralized with hydrochloric acid and the mono-azo-dyestuff is precipitated by the addition of common salt and filtered. The dyestuff is dissolved in 400 parts of water, the solution is acidified with 20 parts of concentrated hydrochloric acid and diazotized by addition of an aqueous solution of 6.9 parts of sodium nitrite. When diazotization is finished the diazo compound is coupled at 5–10° C. with a solution prepared from 11.5 parts of 1:3-dihydroxybenzene, 21 parts of anhydrous sodium carbonate and 100 parts of water. The dis-azo-dyestuff of the formula

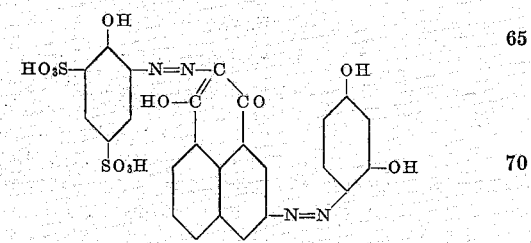

is precipitated by the addition of common salt, filtered and dried.

It is a grey-black powder soluble in water and in caustic soda solution of 10 per cent strength to red-orange solutions, in sodium carbonate solution of 10 per cent strength to a yellow-orange solution and in concentrated sulfuric acid to an orange solution. The new dis-azo-dyestuff dyes wool brown shades which become violet-brown when after-chromed.

*Example 15*

6 parts of the dis-azo-dyestuff prepared according to Example 14 by alkaline coupling of diazotized 2-amino-1-hydroxybenzene-4:6-disulfonic acid with 5-amino-perinaphthindandione, diazotization of the mono-azo-dyestuff and coupling with resorcinol, are dissolved in 100 parts of water and the solution is heated to boiling for 10 minutes with a solution of 4.2 parts of crystallized cobalt sulfate in 20 parts of water. The solution is then evaporated to dryness under reduced pressure.

The new cobalt compound is a grey-black powder soluble in water and in sodium carbonate solution of 10 per cent strength to orange solutions, in caustic soda solution of 10 per cent strength to an orange-red solution and in concentrated sulfuric acid to a yellow-orange solution. It dyes leather fast red-brown shades.

*Example 16*

143.5 parts of 4-chloro-2-amino-1-hydroxybenzene are suspended in 500 parts of water, 120 parts of concentrated hydrochloric acid are added and the base is diazotized at 5° C. with a solution of 69 parts of sodium nitrite in 250 parts of water. The diazo compound is then neutralized and coupled at 0-5° C. with a solution prepared from 282 parts of peri-naphthindandione-5-sulfonic acid, 212 parts of anhydrous sodium carbonate and 1000 parts of water. The dyestuff of the formula

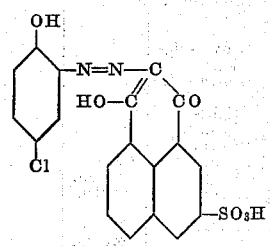

is precipitated by the addition of common salt, filtered and dried.

It is a black powder soluble in water, in sodium carbonate solution of 10 per cent strength and in caustic soda solution of 10 per cent strength to orange solutions and in concentrated sulfuric acid to a red solution. The new dyestuff dyes wool brown-orange shades which become violet-brown when after-chromed.

*Example 17*

A solution of 4.2 parts of the azo-dyestuff obtained according to Example 16 from diazotized 4-chloro-2-amino-1-hydroxybenzene and peri-naphthindandione-5-sulfonic acid in 100 parts of water is heated to boiling for 10 minutes with a solution of 4.2 parts of crystallized nickel sulfate in 20 parts of water. The nickel compound is precipitated by the addition of common salt, filtered and dried.

It is a black powder soluble in water to a yellow-orange solution, in sodium carbonate solution of 10 per cent strength and in caustic soda solution of 10 per cent strength to yellowish-red solutions and in concentrated sulfuric acid to a blackish-red solution. It dyes wool brown-orange shades.

*Example 18*

48.6 parts of the azo-dyestuff from diazotized 6-nitro-2-amino-1-hydroxybenzene-4-sulfonic acid and 5-nitro-perinaphthindandione of the formula

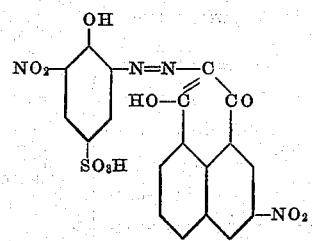

are dissolved in 1000 parts of water and the solution is heated to boiling for 24 hours with a chromium fluoride solution containing 9.1 parts of $Cr_2O_3$. It is then filtered hot from admixed insoluble constituents and the chromium compound is obtained by adding common salt, filtering and drying.

The chromium compound is a grey powder dissolving in water to a red solution, in sodium carbonate solution of 10 per cent. strength and in caustic soda solution of 10 per cent strength to brown-red solutions and in concentrated sulfuric acid to an orange solution. It dyes leather very fast Bordeaux red tints.

Some further dyestuffs obtainable in accordance with the invention are described in the following table:

*Monoazo dyestuffs*

| | | | Dyeings— | | | | |
|---|---|---|---|---|---|---|---|
| The diazo-compounds of— | And— | On wool or leather | On wool and after-chromed | The chromium compound | The copper compound | The nickel compound | The cobalt compound |
| (1) 2-amino-1-hydroxybenzene-4-sulfonic acid. | 5-nitro-perinaphthindandione. | Yellow-brown. | Red-brown. | | | | |
| (2) 4-nitro-2-amino-1-hydroxybenzene-6-sulfonic acid. | ___do___ | Violet-brown. | ___do___ | Brown-red. | | | |
| (3) 4-chloro-2-amino-1-hydroxybenzene-6-sulfonic acid. | ___do___ | Olive-brown. | Violet-brown. | Violet-brown. | | | |
| (4) 4-amino-2-carboxy-1-hydroxybenzene-6-sulfonic acid. | ___do___ | Brown-orange. orange. | Brown-red. red. | | | | |
| (5) 6-nitro-2-amino-1-hydroxybenzene-4-sulfonic acid. | ___do___ | Violet. | Red-brown. | Bordeaux red. | | | Red. |
| (6) 1-amino-2-hydroxynaphthalene-4-sulfonic acid. | ___do___ | Red-brown. | Grey-brown. | | | | |
| (7) Nitro-1-amino-2-hydroxynaphthalene-4-sulfonic acid. | ___do___ | Violet-brown. | Violet-brown. | | | Brown-red. | |

Monoazo dyestuffs—continued

| Dyestuff from: | | Dyeings— | | | | | |
|---|---|---|---|---|---|---|---|
| The diazo-compounds of— | And— | On wool or leather | On wool and after-chromed | The chromium compound | The copper compound | The nickel compound | The cobalt compound |
| (8) 2-amino-1-hydroxybenzene-4-sulfonic acid. | 5-hydroxyperinaphthindandione. | Olive-brown. | ...do... | Violet-brown. | | | |
| (9) 4-nitro-2-amino-1-hydroxybenzene-6-sulfonic acid. | ...do... | Blackish-brown-violet. | Black-brown. | Violet-black. | Brown-black. | | |
| (10) 4-chloro-2-amino-1-hydroxybenzene-6-sulfonic acid. | ...do... | Brown. | Brown-violet. | | | | |
| (11) Nitro-1-amino-2-hydroxynaphthalene-4-sulfonic acid. | ...do... | Violet-brown. | Violet-brown. | Blackish-brown-red. | Red-brown. | | |
| (12) 4-nitro-2-amino-1-hydroxybenzene-6-sulfonic acid (alkaline coupling). | 5-aminoperinaphthindandione. | Red. | Brown-red. | Brown-red. | | | |
| (13) 4-nitro-2-amino-1-hydroxybenzene-6-sulfonic acid (acid coupling). | ...do... | Red-brown. | Olive-green. | Green to olive-green. | | | |
| (14) 2-amino-1-hydroxybenzene-4:6-disulfonic acid (alkaline coupling). | ...do... | Brown. | Brown-violet. | | | | Red to brown-red. |
| (15) 2-amino-1-carboxy-benzene-5-sulfonic acid (alkaline coupling). | ...do... | Yellow. | Brown. | Brown. | | Brownish red. | |
| (16) 1-amino-benzene-4-sulfonic acid (acid coupling). | ...do... | Red-brown. | | | | | |
| (17) 5-amino-perinaphthindandione. | 1-hydroxynaphthalene-4-sulfonic acid. | Red. | Violet-brown. | | | | |
| (18) 5-amino-perinaphthindandione (acid coupling). | 1-aminonaphthalene-4:6-disulfonic acid. | Brown-orange. | | | | | |
| (19) 6-nitro-2-amino-1-hydroxybenzene-4-sulfonic acid. | Perinaphthindione-5-sulfonic acid. | Violet. | Brown-red. | | | | |
| (20) 5-nitro-2-amino-1-hydroxybenzene. | ...do... | Brown. | Violet-brown. | | | | |
| (21) 4-chloro-2-amino-1-hydroxybenzene. | ...do... | Brown-orange. | ...do... | Brown-red. | | Brown-orange. | |
| (22) 4-amino-2-carboxy-1-hydroxybenzene-sulfonic acid. | ...do... | Orange. | Brownish red. | | | | |
| (23) 2-amino-1-hydroxy-benzene-4:6-disulfonic acid. | 5-nitroperinaphthindandione. | | | | | Brown-red. | |
| (24) 2-amino-1-hydroxy-6-carboxy-benzene-4-sulfonic acid. | ...do... | | | | | Brown-yellow. | |
| (25) 2-amino-1-hydroxy-6-carboxy-benzene-4-sulfonic acid. | 5-hydroxy-perinaphthindandione. | | | Brown-violet. | | | |
| (26) 2-amino-1-carboxy-benzene-4-sulfonic acid. | ...do... | | | Brown. | | Olive-yellow. | |
| (27) Nitro-1-amino-2-hydroxynaphthalene-7-sulfonic acid (alkaline coupling). | 5-aminoperinaphthindandione. | | | Violet-brown. | | | |
| (28) 2-amino-1-hydroxybenzene-4:6-disulfonic acid. | Perinaphthindione-5-sulfonic acid. | | | Brown-red. | | | |
| (29) 4-chloro-2-amino-1-hydroxybenzene-6-sulfonic acid. | ...do... | | | Brown-violet. | | | |
| (30) 4-nitro-2-amino-1-hydroxybenzene-6-sulfonic acid. | ...do... | | | Brown-red. | | | |
| (31) 2-aminobenzene-1-carboxylic acid. | ...do... | | | Bright-brown. | | | |
| (32) 4:6-dinitro-2-amino-1-hydroxybenzene. | ...do... | | | Brown. | | | |
| (33) 2-amino-1-hydroxybenzene-4-sulfonic acid. | ...do... | | | | | Red-brown. | |
| (34) 4-nitro-2-amino-1-hydroxybenzene-6-sulfonic acid. | ...do... | | | | | Brown. | |
| (35) 2-amino-1-hydroxy-6-carboxybenzene-4-sulfonic acid. | ...do... | | | | | Bright brown. | |

Disazo dyestuffs

| 1. Diazo-component | 2. Diazo-component | Coupling component | Dyeings— | | | | | |
|---|---|---|---|---|---|---|---|---|
| | | | On wool | On wool and after-chromed | The chromium compound | The copper compound | The chromium nickel compound | The cobalt compound | The copper-cobalt compound |
| (36) 4-chlor-2-amino-1-hydroxybenzene-6-sulfonic acid. | 1-aminobenzene-2:5-disulfonic acid. | 5-hydroxyperinaphthindandione. | Brown. | Brown-violet. | | | | | |
| (37) 2-amino-1-hydroxybenzene-4-sulfonic acid. | 2-amino-1-hydroxybenzene-4-sulfonic acid. | ...do... | Olive-brown. | Blackish-violet-brown. | | | | | |
| (38) 4-nitro-2-amino-1-hydroxybenzene-6-sulfonic acid. | 4-nitro-2-amino-1-hydroxy-benzene-6-sulfonic acid. | ...do... | Violet-black. | Blackish brown-violet. | grey violet-black. | | | | Violet-brown. |
| (39) 1-amino-2-hydroxynaphthalene-4-sulfonic acid. | 1-aminobenzene-2:5-disulfonic acid. | ...do... | Blackish-Bordeaux red. | Violet-brown. | Grey-violet. | | | Brown-red. | |
| (40) nitro-1-amino-2-hydroxy-naphthalene-4-sulfonic acid. | Nitro-1-amino-2-hydroxy-naphthalene-4-sulphonic acid. | ...do... | Violet-brown. | ...do... | Violet-brown. | | Brown. | | |

Disazo dyestuffs—continued

| 1. Diazo-component | 2. Diazo-component | Coupling component | Dyeings— | | | | | | |
|---|---|---|---|---|---|---|---|---|---|
| | | | On wool | On wool and after chromed | The chromium compound | The copper compound | The chromium pound compound | The cobalt compound nickel | The copper-cobalt compound |
| (41) 6-nitro-2-amino-1-hydroxybenzene-4-sulfonic acid. | 1-aminobenzene-4-sulfonic acid. | ----do---------- | | | Brown-black. | | Black-brown. | | |
| (42) 1-aminobenzene-2:4-disulfonic acid (alkaline). | 4-nitro-2-amino-1-hydroxybenzene-6-sulfonic acid (acid). | 5-aminoperi-naphthin-dandione. | | | | | Olive brown. | | |
| (43) 4-chloro-2-amino-1-hydroxybenzene-6-sulfonic acid (alkaline). | 1-aminobenzene-2:4-disulfonic acid (acid). | ----do---------- | Olive-brown. | Blackish violet. | | | | | |
| Diazo compound of— | Coupled with— | Diazotized and further coupled with— | | | | | | | |
| (44) 2-amino-1-hydroxybenzene-4:6-disulfonic acid. | 5-aminoperi-naphthindan-dione. | 1:3-dihydroxy-benzene. | Brown. | Violet brown. | | | | Red-brown. | |
| (45) 2-amino-1-carboxybenzene-4-sulfonic acid. | ----do---------- | 1-(3'-sulfo) phenyl-3-methyl-pyrazolone(-5). | | | Red-brown. | | | | |

What we claim is:

1. Process for the manufacture of metalliferous azo-dyestuffs, comprising uniting such diazo- and coupling components with one another of which at least one contains lake-forming groups and at least one is a perinaphthindandione containing a substituent selected from the group consisting of nitro, hydroxyl, amino and sulfo, and reacting the azo-dyestuffs thus obtained with agents yielding metal.

2. Process for the manufacture of metalliferous azo-dyestuffs, comprising uniting such diazo-components which contain lake-forming groups with perinaphthindandiones containing a substituent selected from the group consisting of nitro, hydroxyl, amino and sulfo, and reacting the azo-dyestuffs thus obtained with agents yielding metal.

3. Process for the manufacture of metalliferous azo-dyestuffs, comprising uniting such diazo-components which contain lake-forming groups with perinaphthindandiones substituted by a nitro-group, and reacting the azo-dyestuffs thus obtained with agents yielding metal.

4. Process for the manufacture of metalliferous azo-dyestuffs, comprising uniting such diazo-components which contain lake-forming groups with perinaphthindandiones containing a substituent selected from the group consisting of nitro, hydroxyl, amino and sulfo, and reacting the azo-dyestuffs thus obtained with agents yielding chromium.

5. Process for the manufacture of metalliferous azo-dyestuffs, comprising uniting such diazo-components which contain lake-forming groups with perinaphthindandiones substituted by a nitro-group, and reacting the azo-dyestuffs thus obtained with agents yielding chromium.

6. Process for the manufacture of metalliferous azo-dyestuffs, comprising uniting diazotized 2-amino-1-hydroxybenzenes which contain at least one further substituent with perinaphthindandiones substituted by a nitro-group, and reacting the azo-dyestuffs thus obtained with agents yielding chromium.

7. Process for the manufacture of metalliferous azo-dyestuffs, comprising uniting diazotized 6-nitro-2-amino-1-hydroxybenzene-sulfonic acid with 5-nitro-perinaphthindandione, and reacting the azo-dyestuff thus obtained with agents yielding chromium.

8. Complex metal compounds of the azo-dyestuffs of the general formula

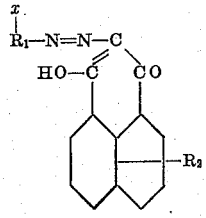

wherein $R_1$ stands for the radical of a diazo-component, $x$ stands for a lake-forming group and $R_2$ stands for at least one nitro-group.

9. Complex metal compounds of the azo-dyestuffs of the general formula

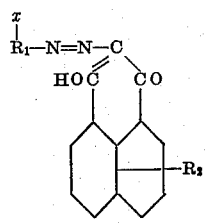

wherein $R_1$ stands for the radical of a diazo-component, $x$ stands for a lake-forming group and $R_2$ stands for at least one nitro-group.

10. Complex chromium compounds of azo-dyestuffs of the general formula

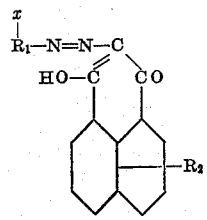

wherein $R_1$ stands for the radical of a diazo-component, $x$ stands for a lake-forming group and $R_2$ stands for at least one substituent selected from the group consisting of nitro, hydroxyl, amino and sulpho.

11. Complex chromium compounds of azo-dyestuffs of the general formula

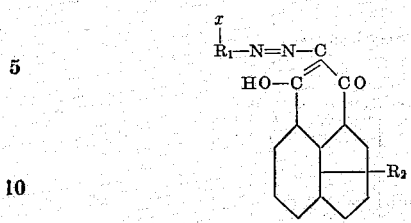

wherein $R_1$ stands for the radical of a diazo-component, $x$ stands for a lake-forming group and $R_2$ stands for at least one nitro-group.

12. Complex chromium compounds of the azo-dyestuffs of the general formula

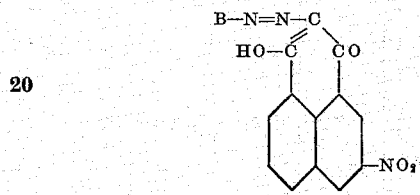

wherein B stands for the radical of a diazo-compound of a 2-amino-1-hydroxybenzene containing at least one further substituent.

13. Complex chromium compounds of the azo-dyestuff of the formula

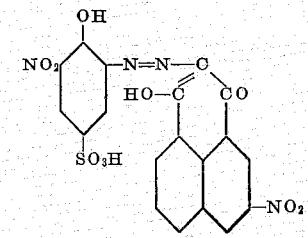

FRITZ STRAUB.
PETER PIETH.